United States Patent [19]
Welch et al.

[11] Patent Number: 5,255,332
[45] Date of Patent: Oct. 19, 1993

[54] NXN OPTICAL CROSSBAR SWITCH MATRIX

[75] Inventors: David F. Welch, Palo Alto; Donald R. Scifres, San Jose; Robert G. Waarts, Palo Alto; Amos A. Hardy, Stanford; David G. Mehuys; Stephen O'Brien, both of Sunnyvale, all of Calif.

[73] Assignee: SDL, Inc., San Jose, Calif.

[21] Appl. No.: 915,918

[22] Filed: Jul. 16, 1992

[51] Int. Cl.⁵ .............................. G02B 6/36
[52] U.S. Cl. .................................. 385/17
[58] Field of Search ............... 385/1, 2, 3, 4, 8, 10

[56] References Cited

U.S. PATENT DOCUMENTS

| | | | |
|---|---|---|---|
| 4,013,000 | 3/1977 | Kogelink | 385/2 |
| 4,103,988 | 8/1978 | Désormiére et al. | 350/162 R |
| 4,381,881 | 5/1983 | Bell | 350/96.16 |
| 4,679,901 | 7/1987 | Dammann et al. | 350/162.2 |
| 4,781,442 | 11/1988 | Koster et al. | 350/354 |
| 4,856,863 | 8/1989 | Sampsell et al. | 350/96.16 |
| 4,932,735 | 6/1990 | Koai | 350/96.13 |
| 4,953,155 | 8/1990 | Tangonan et al. | 370/1 |
| 4,955,686 | 9/1990 | Buhrer et al. | 350/96.20 |
| 4,988,157 | 1/1991 | Jackel et al. | 385/1 |
| 4,995,690 | 2/1991 | Islam | 350/96.15 |
| 4,995,693 | 2/1991 | Wilson | 350/96.18 |
| 5,002,354 | 3/1991 | Koai | 350/96.14 |
| 5,002,355 | 3/1991 | Caron | 350/96.15 |
| 5,009,477 | 4/1991 | Alferness et al. | 350/96.15 |

Primary Examiner—Akm E. Ullah
Attorney, Agent, or Firm—Schneck & McHugh

[57] ABSTRACT

An optical crossbar switch matrix for use in switching optical signals from a first set of optical fibers to a second set of optical fibers, in any order, which is characterized by having a matrix of rows and columns of diffraction gratings formed in a semiconductor heterostructure. Each grating is independently biased with either a forward or reverse bias voltage to switch the grating between a reflective state and a transmissive state. The gratings are oriented at an angle relative to the rows and columns so that when the Bragg condition for the light received from an optical film is met, a portion of the light is diffracted from the row in which it is propagating into a column toward another optical fiber. The heterostructure may include optical amplifiers to restore the optical signal to its original power level. Beam expanding, collimating and focussing optics may also be integrated into the heterostructure.

13 Claims, 1 Drawing Sheet

NXN OPTICAL CROSSBAR SWITCH MATRIX

DESCRIPTION

1. Technical Field

The present invention relates to optical switching systems for coupling light transmitting fibers, and in particular to optical crossbar switching networks of the type having optical waveguides monolithically integrated with electro-optic switching means.

2. Background Art

Optical fibers are gradually replacing copper wire electrical links in telephone communications. Having originally been used for long distance trunk cables connecting local telephone offices, the cost of optical fibers is now approaching a point where their substitution in local telephone distribution networks is justified. Optical fibers are also useful as part of local area networks (LANs) for data exchange between computers and computer terminals, in supercomputers and other parallel processing systems to provide interconnections between their microprocessors and memory, in phased array radar systems to connect the radar sensing array to a signal processing unit, in aircraft avionics and other control systems, and in many other developing applications. High speed, extremely high information bandwidth and immunity to radio frequency noise are several of the characteristics of optical fibers of which those applications take advantage.

Many of these applications require an optical switching network in order to dynamically reconfigure the fiber-to-fiber interconnections. In some applications, such as telephone communications, it is desirable, but not essential, that the switching be fast, while other applications, such as time multiplexed LANs or supercomputer systems, require rapid switching capabilities.

In U.S. Pat. No. 4,988,157, Jackel et al. describe an optical switching matrix having an intersecting structure of parallel input waveguides and parallel output waveguides formed on a substrate perpendicular to one another so that they cross. 45° slots are formed in the structure across the intersections of the two sets of waveguides. The slots are filled with a liquid that matches the refractive index of the waveguides. Electrodes positioned adjacent to the slots form gas bubbles in the slots by electrolysis of the liquid at selected intersections. One of the electrodes catalyzes the reformation of the liquid from the bubble components when a voltage pulse of sufficient size is applied. Light in the input waveguides are transmitted through an intersection in the presence of liquid, but are reflected into an output waveguide in the presence of a bubble. Switching times were 20 ms and 1.5 s, respectively, for transmit-to-reflect and reflect-to-transmit transitions.

In U.S. Pat. Nos. 4,932,735 and 5,002,354, Koai controls optical coupling between adjacent waveguides to route the optical signal in a selected manner. Preferred couplers, such as directional couplers or reverse delta-beta couplers, make use of the electrooptic effect as their control mechanism, with pairs of electrodes supplying a voltage polarity which in one state causes light to cross over to the adjacent waveguide and in an opposite state prevents this crossover. The switches have a high extinction ratio for the unused light paths and low crosstalk.

In U.S. Pat. No. 4,995,693, Wilson describes an optical switch that includes a multichannel acousto-optic (Bragg) cell used to deflect light beams from input optical fibers to desired output optical fibers. The angle of deflection is the function of the frequency of an RF control signal.

In U.S. Pat. No. 4,013,000, Kogelnik describes an optical switching network in which a first plurality of parallel optical waveguide channels in a first plane crosses over a second plurality of parallel optical waveguide channels in a second plane without intersecting, such that each region of closest approach defines a potential switching crosspoint. At each crosspoint are a first beam-to-guide grating-type coupler and a second beam-to-guide coupler laterally disposed from the first in a direction chosen to define the optical communication path between the crossing waveguide channels. The first coupler acts to couple the optical signal out from the first waveguide channel. The second coupler acts to couple the optical signal from the first coupler into the second waveguide channel. Each of the couplers is controllable between noncoupling and coupling conditions with respect to its related waveguide channel, so that light in a first waveguide channel is switched at a crosspoint into a second waveguide channel only if both couplers at that crosspoint are in their coupling condition.

An object of the invention is to provide an optical crossbar switch matrix which is capable of rapid switching rates, low noise and is expandable to a large number of optical fiber connections.

DISCLOSURE OF THE INVENTION

The above object has been met by an optical crossbar switch matrix that has gratings formed on a substrate in a matrix of rows and columns of gratings. The gratings are oriented at a nonperpendicular angle, so that an optical signal propagating through a row of gratings from an optical fiber input will be diffracted into a column toward an optical fiber output, whenever the grating at the intersection of that row and column is biased such that the Bragg condition of the grating is met by the optical signal. Thus, any optical signal from a fiber input can be switched into any fiber output by the appropriate voltage biasing of a grating switch.

The gratings may be monolithically integrated in a semiconductor heterostructure proximate to a transverse waveguide layer of the heterostructure in order to interact with lightwaves received from optical fiber inputs propagating in the waveguide layer. Electrical contacts provide individually addressable bias voltage means for switching the angled gratings between a reflective state and a transmissive state. Other optical elements, such as optical amplifiers and beam width adjusting optics, may also be integrated into the heterostructure.

BEST MODE FOR CARRYING OUT THE INVENTION

Figure 1:
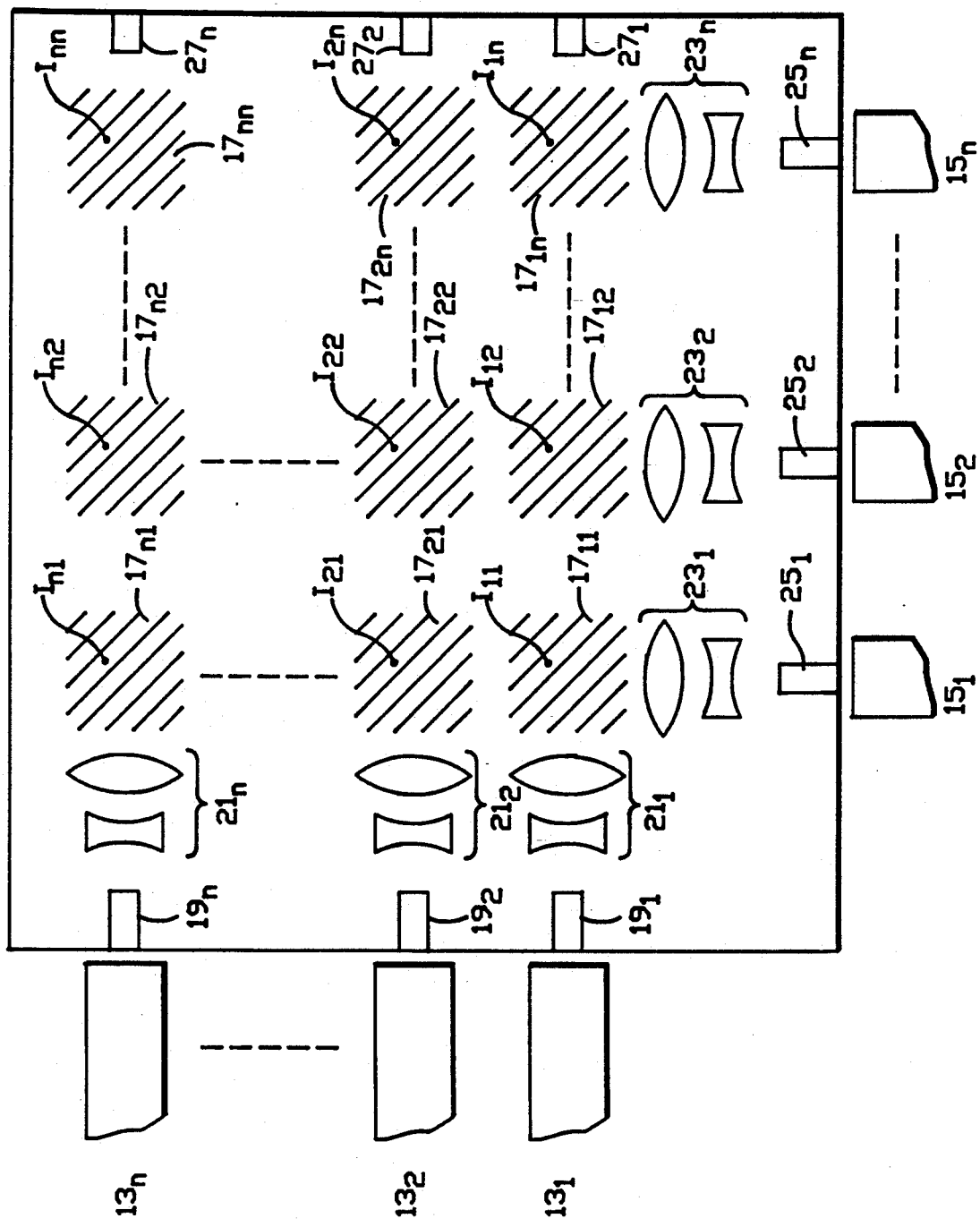
FIG. 1 is a top plan view of a crossbar switch matrix of the present invention.

With reference to FIG. 1, an NxN optical crossbar switch matrix 11 of the present invention couples to N optical fibers 13 for receiving optical signal inputs therefrom and couples to another N optical fibers 15 for transmitting optical signal outputs thereto. The switch matrix 11 enables any of the N optical signal inputs from the optical fibers 13 to couple, as optical signal outputs, to any of the N optical fibers 15. The active switching elements in the matrix 11 are gratings 17 that are oriented at an angle to the received optical signal inputs. The gratings 17 together with any optical amplifiers and beam expanding, collimating and focusing optical elements 19, 21, 23 and 25 for receiving and directing the optical signals along optical paths between the optical fibers 13 and 15 and gratings 17 are preferably monolithically integrated on a common substrate of the matrix 11. Alternatively, only the gratings 17 might be monolithically integrated, with some or all of the other elements 19, 21, 23 and 25 constituting external optics coupling the fibers 13 and 15 to the switch matrix 11.

The matrix 11 is preferably formed from a semiconductor heterostructure similar to those used for semiconductor laser diodes and optical amplifiers. Such semiconductor heterostructures include a plurality of semiconductor layers formed in a semiconductor substrate, the layers forming a waveguide for lightwave propagation. The waveguide is generally formed from an active region of one or more layers proximate to a pn junction of the semiconductor material and a set of higher effective bandgap, lower effective refractive index, cladding layers sandwiching the active region from above and below the active region layers. The active region does not have to be tuned to the injected signal for the optical switch to work. In the optical switch matrix 11, the compositions of the layers are selected to be transparent to the wavelength of the optical signals. Typically, AlGaAs, InGaAsP or other group III-V semiconductor compounds are used. Gratings 17 may be formed in any layer boundary of the heterostructure, such as a cladding layer surface, that interacts with the optical signal propagating in the waveguide layers. Photolithographic etching techniques may be used to form the gratings 17.

The operation of the angled grating optical switches 17 results from a bias-voltage-induced refractive index change in the waveguide regions associated with those switches 17. The effective index of refraction at an angled grating 17 is a function of the reverse bias voltage applied to the waveguide in the neighborhood of the grating. Alternatively, the grating region can be forward biased, where the injected charge induces a change in the refractive index. Typically, a refractive index change on the order of 0.01 can be caused. As a result of this refractive index change, the Bragg condition of the grating 17 changes to a different wavelength band. This determines the diffraction efficiency for the incident light beam. If the index of refraction is chosen such that the incident beam satisfies the Bragg condition of the grating, a portion of the optical signal will be diffracted at the blaze angle of the grating toward the output channels 15. In the off state, where the applied bias to the angled grating region is such that the incident light does not satisfy the Bragg condition, the beam propagates unperturbed through the grating region 17, to be sampled by a subsequent switch 17. The diffraction efficiency is high only for the optical signal. The ratio of the on and off states of the gratings is greater than 20 dB. Any spontaneous emission noise which propagates through the matrix does not satisfy the Bragg condition of the gratings and therefore does not couple to the output fibers 15.

Each of the optical signal inputs from single mode optical fibers 13 is coupled to a single transverse mode lateral waveguide optical amplifier 19. The coupling loss from optical fiber 13 to amplifier 19 is about 3 dB. The signals are amplified to an output power of approximately 100 mW.

The amplified optical signal is coupled to a series of monolithically integrated refractive elements 21, such as prisms or lenses, to expand and collimate the light beam carrying the optical signal to a width of approximately 200 $\mu$m. The amplifier 19 and refractive elements 21 may be formed by introducing lateral refractive index variations into the heterostructure by such well known techniques as etch-and-regrowth, selective doping and impurity-induced disordering to vary the semiconductor material composition.

The outputs of the beam expanding optics 21 are coupled to the first column of N angled grating switches $17_{x1}$, where $x=1, \ldots, n$. Preferably, only one of the grating switches 17 in the first column is in the "on" state at any one time so that only one input optical signal from fibers 13 is coupled into the first optical output fiber $15_1$. Optical signals that pass unperturbed through grating switches in the "off" state proceed to subsequent columns of grating switches $17_{x2}, 17_{x3}, \ldots, 17_{xn}$. Preferably, only one switch in each column is in the "on" state. Typically, each row of grating switches has only one on switch, so that each optical signal input is coupled to only one output optical fiber 15. However, it is also possible that an optical signal input can fan-out to more than one optical fiber 15. Depending on the power of the amplified signal and the diffraction efficiency of each grating switch 17, a fan-out of ten or more can be achieved.

The coupling of the optical signal by the angled gratings 17 to the output fibers 15 can be as high as 10%, so that a 100 mW amplified input will produce a 10 mW diffracted output signal. The diffracted beams are nearly pure optical signal, since any spontaneous emission noise associated with the amplifiers 19 are not diffracted by the angled gratings 17. Each of the diffracted beams is focused by refracting elements 23 into an output amplifier 25. Refracting elements 33 and output amplifier 25 may be formed by the same refractive index varying techniques used to produce refracting elements 21 and input amplifier 19. Approximately 50% of the 10 mW diffracted signals are coupled into amplifiers 25. These 5 mW injected signals are above the typical 3 mW saturation power of the output amplifiers 25, so the amplifiers 25 will operate in a low noise condition. The amplified signals are coupled into the single mode output fibers 15. Assuming a typical 3 dB loss from coupling into the fibers 15, the gain of the amplifiers 25 is selected so that at least 10 mW of optical power is coupled into the fibers 15.

Detectors 27 may be monolithically integrated on the switch matrix 11 collinear with input fibers 13, input amplifiers 19, beam expansion optics 21 and rows of angled grating switches 17 in order to monitor the operation of the grating switches 17. A reduction in the observed light intensity reaching the detectors 27 indicates that a switch 17 is in the "on" state. Further, reduction in observed light intensity indicates more than one switch in the "on" state, i.e. broadcasting of an input signal into multiple output fibers 15. A complete absence of observed light may indicate an inactive input optical fiber 13, poor coupling, or an inoperative input amplifier 19. The monitoring by the detectors 27 can be used as feedback to ensure the correct voltage bias needed to satisfy the Bragg condition for switching the state of one grating 17.

An advantage of angled gratings 17 as switches is that the Bragg condition is satisfied only for a narrow diffraction bandwidth, so a high signal-to-noise ratio is maintained in the system. Only low drive currents are needed to switch the Bragg condition, because the gratings are very efficient. Further, the modulation speed is not limited by the recombination of carriers in the active region, as in optical amplifiers, but by the residual RC time constants of the switching bias voltages. Accordingly, switching rates on the order of several gigabits per second are achievable. The angled gratings 17 can be constructed to enhance diffraction of either TE or TM mode radiation, and thereby allow demultiplexing of the two signal polarization components, or can be made to give equal diffraction efficiency to both. Also, because the grating switches 17 in the "off" state pass the optical signal substantially unperturbed with only negligible loss, the switch matrix is easily expandable to very large arrays. This contrasts with branching network-type switches that require gain in each of the $N^2$ waveguide branches to offset losses where waveguides split.

We claim:

1. An optical interconnection network comprising
a plurality of grating reflectors formed on a substrate in a matrix of rows and columns, each having firs and second states with respect to a received optical signal,
means for receiving and directing optical signal inputs in a first set of optical paths through rows of said grating reflectors, and
means applying a bias voltage to said grating reflectors for switching each said grating reflector to a selected state, such that optical signals directed onto grating reflectors in said first state continue propagating along said optical paths of said first set unperturbed by said grating reflectors to other grating reflectors in said rows, and such that optical signals directed onto grating reflectors in said second state are reflected by said grating reflectors form optical paths of said first set into optical paths of a second set directed through columns of said grating reflectors to form optical signal outputs.

2. The network of claim 1 further comprising
a first optical fiber system coupling said optical signal inputs to said receiving means, and
a second optical fiber system coupled to receive said optical signal outputs from said second set of optical paths.

3. The network of claim 1 wherein said receiving means includes optical amplifiers formed on said substrate along said optical paths of said second set.

4. An optical crossbar switch comprising
a plurality of input optical fibers providing a set of optical signals,
a plurality of output optical fibers,
a plurality of gratings formed on a substrate in a matrix of rows and columns, each of said gratings having a reflective first state and a transmissive second state with respect to optical signals received thereby dependent upon a bias voltage applied to said gratings,
means on said substrate coupled to said input optical fibers to receive said set of optical signals for directing said optical signals in a first set of optical paths through said rows of gratings, and
means applying a bias voltage to said gratings for switching each of said gratings to a selected one of said first and second states, such that an optical signal incident upon a grating in a first state is reflected from said optical path of said first set into an optical path of a second set directed through columns of gratings to a corresponding output optical fiber, and such that an optical signal incident upon a grating in a second state is transmitted along said optical path of said first set to another grating in said row of gratings.

5. The switch of claim 4 wherein said optical signal receiving and directing means includes beam width expanding and collimating optics formed on said substrate between said input optical fibers and each row of gratings.

6. The switch of claim 4 further comprising focussing optics formed on said substrate between each column of gratings and said output optical fibers so as to couple light propagating along each column into a corresponding output optical fiber.

7. The switch of claim 4 further comprising a plurality of optical amplifiers formed on said substrate.

8. The switch of claim 7 wherein said optical amplifiers are formed between each column of gratings and said plurality of output optical fibers.

9. The switch of claim 4 wherein said gratings are formed at a layer boundary in a multilayer semiconductor heterostructure proximate to a waveguide of said heterostructure for said optical signals.

10. The switch of claim 9 wherein said bias voltage applying means includes conductive contacts on top and bottom surfaces of said heterostructure, said conductive contacts on said top surface of said heterostructure being formed as a matrix of contact lying directly above said gratings.

11. The switch of claim 4 wherein said gratings are oriented at a 45° angle relative to the direction of said rows and columns, said rows and columns being perpendicular to one another.

12. The switch of claim 4 wherein said gratings are oriented at an angle, relative to the direction of said rows and columns, selected to equalize coupling by said gratings of TE and TM polarization modes of said optical signals from said first set of optical paths into said second set of optical paths.

13. The switch of column 4 wherein said optical signals are multiplexed signals composed of multiple wavelengths, said gratings in each row of gratings having different grating periods selected to couple each wavelength of said multiplexed signal into a different optical path of said second set, thereby demultiplexing said optical signals.

* * * * *

UNITED STATES PATENT AND TRADEMARK OFFICE
CERTIFICATE OF CORRECTION

PATENT NO. : 5,255,332
DATED : October 19, 1993
INVENTOR(S) : David F. Welch et al.

It is certified that error appears in the above-indentified patent and that said Letters Patent is hereby corrected as shown below:

Claim 1, column 5, line 26, "each having firs" should read - - each having first - -.

Claim 1, column 5, line 41, "form optical paths" should read - - from optical paths - -.

Signed and Sealed this

Fourteenth Day of June, 1994

Attest:

BRUCE LEHMAN

Attesting Officer      Commissioner of Patents and Trademarks